(12) United States Patent
Kalisz

(10) Patent No.: US 8,511,706 B2
(45) Date of Patent: Aug. 20, 2013

(54) AIR BAG DEPLOYMENT SYSTEM WITH DEFLECTOR RIB

(75) Inventor: Raymond E. Kalisz, Livonia, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 193 days.

(21) Appl. No.: 12/887,690

(22) Filed: Sep. 22, 2010

(65) Prior Publication Data

US 2012/0068441 A1  Mar. 22, 2012

(51) Int. Cl.
*B60R 21/217* (2011.01)
*B60R 21/205* (2011.01)
*B60R 21/215* (2011.01)

(52) U.S. Cl.
USPC ............. 280/728.2; 280/728.3; 280/732

(58) Field of Classification Search
USPC ................... 280/728.2, 728.3, 732
See application file for complete search history.

(56) References Cited

U.S. PATENT DOCUMENTS

| | | | | |
|---|---|---|---|---|
| 5,478,106 A | * | 12/1995 | Bauer et al. | 280/728.3 |
| 5,992,876 A | * | 11/1999 | Gray | 280/728.3 |
| 6,328,367 B1 | | 12/2001 | Eichhorn et al. | |
| 7,464,958 B2 | * | 12/2008 | Kong | 280/728.3 |
| 7,556,285 B1 | * | 7/2009 | Hayashi | 280/728.3 |
| 7,631,890 B1 | | 12/2009 | Kalisz et al. | |
| 2005/0127641 A1 | * | 6/2005 | Cowelchuk et al. | 280/728.3 |
| 2006/0131844 A1 | * | 6/2006 | Trevino et al. | 280/728.3 |
| 2006/0267314 A1 | * | 11/2006 | Yasuda et al. | 280/728.3 |
| 2007/0040360 A1 | * | 2/2007 | Riha et al. | 280/728.3 |
| 2008/0073885 A1 | * | 3/2008 | Cowelchuk et al. | 280/728.3 |
| 2008/0211208 A1 | * | 9/2008 | Evans | 280/728.3 |
| 2009/0243265 A1 | * | 10/2009 | Evans et al. | 280/728.3 |
| 2009/0256335 A1 | * | 10/2009 | Reil et al. | 280/728.2 |
| 2010/0109296 A1 | | 5/2010 | Mazzocchi et al. | |
| 2010/0109297 A1 | | 5/2010 | Mazzocchi et al. | |

\* cited by examiner

*Primary Examiner* — Joseph Rocca
*Assistant Examiner* — George Spisich
(74) *Attorney, Agent, or Firm* — MacMillan, Sobanski & Todd, LLC

(57) ABSTRACT

An improved air bag deployment system that protects welds or other bonds that are made between the underside of an instrument panel substrate and the outer flange of an air bag deployment chute. A deflector element is located in the gap between the chute flange and the substrate to prevent the deploying air bag from expanding into the gap and potentially damaging the bond.

14 Claims, 1 Drawing Sheet

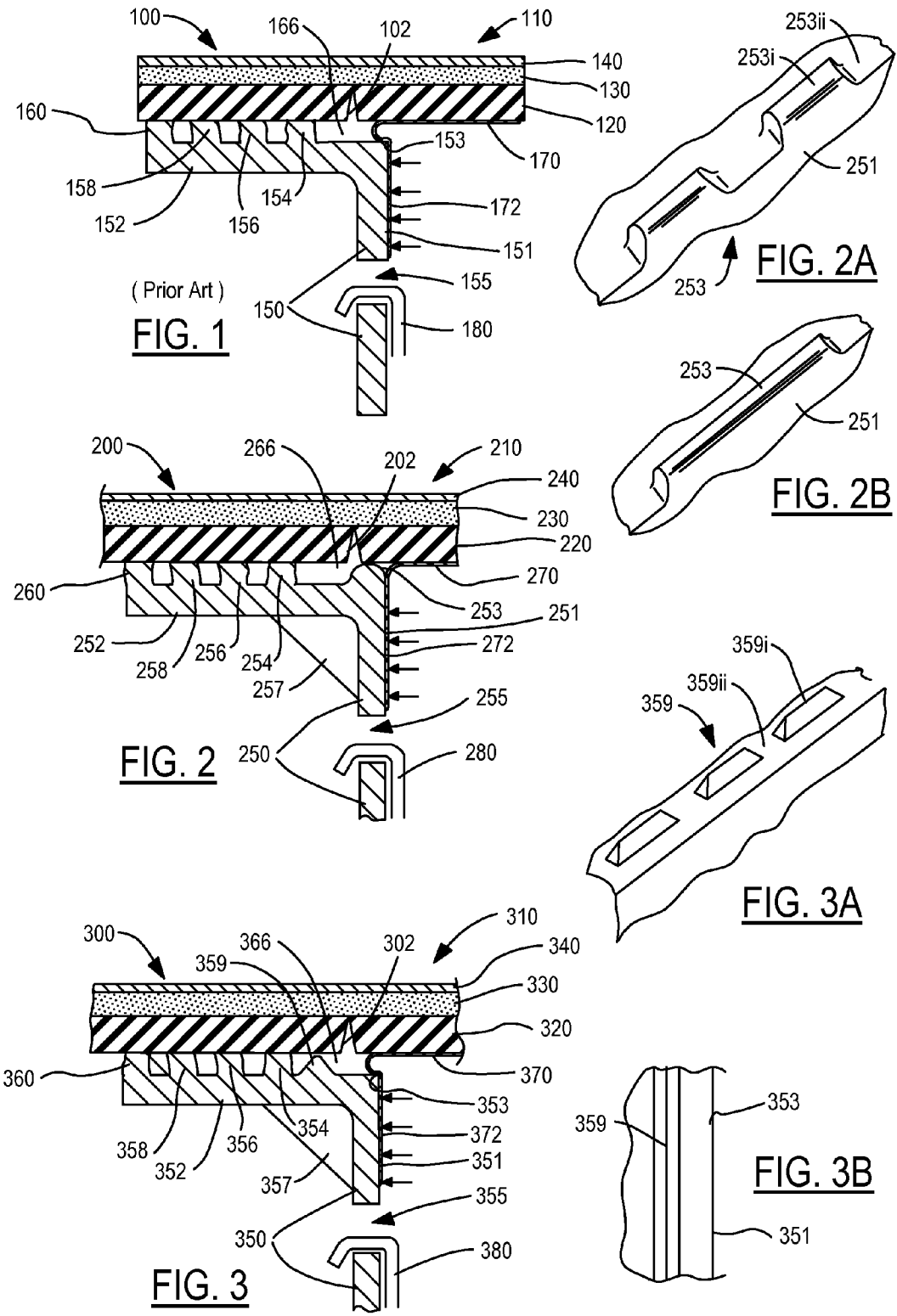

AIR BAG DEPLOYMENT SYSTEM WITH DEFLECTOR RIB

BACKGROUND OF THE INVENTION

This invention relates to the field of air bag deployment systems for an automotive vehicle and more particularly to the area of an air bag deployment chute that is bonded to the underside of an instrument panel substrate.

FIG. 1 illustrates a prior art configuration of an air bag deployment system 100 in which an air bag deployment chute 150, having a flange 152, is bonded to the underside of an instrument panel substrate 120. Chute 150 is a one piece molded structure that contains several apertures 155 into which hooks 180 extending from an air bag container is attached. Although not shown, the air bag container is permanently attached to the vehicle structure. Hooks, such as 180, together with the air bag container perform the task of restraining the instrument panel 100 and the air bag deployment chute 150 from movement during air bag deployment. In such a manner, most all energy from the deploying air bag is directed outward to cause the pre-weakened seams 102 that form the deployment door 110 to fracture and allow release of the air bag from its container.

Instrument panel base substrate 120 contains a pre-weakened seam 102 that, depending on the outer layers, may extend through the base and in some cases partially through the upper layers to provide a desired invisible seam. In this illustration, air bag chute 150, foam layer 130 and outer layer of a class "A" skin 140 are all formed of TPO (Thermoplastic Olefin) materials to facilitate recycling. As such, only the base substrate 120 needs to be scored or otherwise formed to be undercut in the tear seam path that defines the deployment door. The layers 130 and 140 are typically bonded together with adhesives or the like. However, the bonding of the flange 152 of deployment chute 150 to the underside of the substrate 120 is typically performed via ultrasonic welding. In such bonding, ribs 154, 156, 158, 160, etc. are integrally formed in the upper surface portion of flange 152. When welded to the underside of substrate 120, a small gap 166 often remains between the flange 152 and substrate 120 due to the volume of the melted ribs.

Air bag 170 is shown in FIG. 1 as beginning its deployment. Arrows are used to represent the side forces developed against the air bag side wall 172 due to the expanding gas that is generated to inflate the air bag against internal wall 151 of the deployment chute 150. In the configuration of FIG. 1, the air bag 170 fabric is shown as diverting around the upper corner 153 of internal wall 150 and into the gap 166. When this occurs, excessive pressure can be generated on the weld 154 that may cause fracturing of the weld bond between flange 152 and substrate 120, before the door seam 102 fractures and allows the air bag to fully deploy. It is also believed that the side wall 151 of chute 150 may be slightly expanded during this early stage of deployment that, in turn, may cause corner 153 to be lowered and gap 166 to be enlarged and therefore allow the air bag 170 fabric to further migrate towards the weld 154.

SUMMARY OF THE INVENTION

The described embodiments are directed to an improved apparatus and method for protecting the welds or other bonds that are made between the underside of an instrument panel substrate and the outer flange of an air bag deployment chute. Diversion barriers are placed in the gap between the chute flange and the substrate to prevent the deploying air bag from expanding into the gap and potentially breaking the bond.

BRIEF DESCRIPTION OF THE DRAWINGS

FIG. 1 is a cross-sectional view of a portion of an air bag deployment system of the prior art.

FIG. 2 is a cross-sectional view of a portion of an air bag deployment system employing a disclosed embodiment.

FIG. 2A is a perspective view of one version of the embodiment shown in FIG. 2 with a barrier of varying heights.

FIG. 2B is a a perspective view of another version of the embodiment shown in FIG. 2 with a barrier of a continuous height.

FIG. 3 is a cross-sectional view of a portion of an air bag deployment system employing another disclosed embodiment.

FIG. 3A is a perspective view of one version of the embodiment shown in FIG. 3 with a barrier of varying heights.

FIG. 3B is a top view of another version of the embodiment shown in FIG. 3 with a barrier of a continuous height.

DETAILED DESCRIPTION OF PREFERRED EMBODIMENTS

The embodiment shown in FIG. 2 illustrates an improvement to an air bag deployment system. In the FIG. 2 embodiment, a portion of an air bag deployment system 200 is shown in which a base substrate 220 supports a foam layer 230 and an outer skin 240. An air bag deployment chute 250 with an inner side wall 251 and flange 252 is shown with deformable ribs 254, 256, 258 and 260 on flange 252 that are preferably ultrasonically welded to the lower surface of substrate 220. A pre-weakened tear seam 202 is slightly off-set from the opening of air bag deployment chute 250, and the deployment door 210 is defined by the tear seam path and hinge (not shown). Although only a small portion of the air bag deployment system is shown, it should be understood that flange 252 extends and weld ribs are provided around the entire door 210 outward from tear seam 202.

Air bag deployment chute 250 contains a gusset 257 to stiffen side wall 251 and flange 252 during air bag deployment. Deflector rib 253 is formed into the corner between the side wall 251 and flange 252 so as to protrude into a non-bonded area forming an air gap 266 between the flange 252 and lower surface of substrate 220. Although only shown in cross-section, deflector rib 253 extends along the corner edge of air bag deployment chute 250 so as to protect all flange welds adjacent the chute opening. Deflector rib 253 is sufficiently high to block the entry of the air bag 270 fabric into gap 266 and prevent damage to weld 254 during air bag deployment.

Air bag 270 is depicted in FIG. 2 at the moment during deployment activation prior to sufficient force build up that fractures tear seam 202. As can be seen, deflector rib 253 prevents the air bag 270 fabric from entering gap 266 and from causing damage to weld 254.

FIGS. 2A and 2B illustrate alternate versions of the embodiment shown in FIG. 2. In FIG. 2A, the deflector rib 253 is formed to have portions of varying heights 253$i$ and 253$ii$ that are spaced apart, but provide a sufficient barrier to air bag fabric entering the gap 266. In FIG. 2B, the deflector rib 253 is formed to have a substantially continuous height to block the air bag fabric from entering gap 266.

The embodiment shown in FIG. 3 illustrates another improvement to an air bag deployment system. In the FIG. 3 embodiment, a portion of an air bag deployment system 300 is shown in which a base substrate 320 supports a foam layer 330 and an outer skin 340. An air bag deployment chute 350 with an inner side wall 351 and flange 352 extending from the corner 353 at the chute opening. Flange 352 contains deformable ribs 354, 356, 358 and 360 that are preferably ultrasonically welded to the lower surface of substrate 320. A pre-weakened tear seam 302 is slightly off-set from corner 353 at the opening of air bag deployment chute 350, and the deployment door 310 is defined by the tear seam path and hinge (not shown).

Air bag deployment chute 350 contains a gusset 357 to provide stiffening to side wall 351 and flange 352. Deflector rib 359 is formed onto flange 352 between weld rib 354 and tear seam 302 so as to protrude into gap 366 that results between the flange 352 and lower surface of substrate 320. Deflector rib 359 is sufficiently high to block the entry of the air bag 370 fabric into gap 366 to a point where it could damage weld 354 during air bag deployment. Alternatively, the deflector rib could be formed on the lower surface of base substrate 320 to protrude into gap 366 with equivalent results.

Air bag 370 is depicted in FIG. 3 at the moment during deployment activation prior to sufficient force build up that fractures tear seam 302. As can be seen, deflector rib 353 prevents the forces from the air bag fabric from damaging the weld 354, while applying forces against tear seam 302 and deployment door 310.

FIGS. 3A and 3B illustrate alternate versions of the embodiment shown in FIG. 3. In FIG. 3A, the deflector rib 359 is formed to have portions of varying heights 359i and 359ii that are spaced apart, but provide a sufficient barrier to prevent air bag fabric from damaging weld 354. In FIG. 3B, the deflector rib 359 is formed to have a substantially continuous height to prevent the air bag fabric from damaging weld 354.

As can be seen by the drawings and accompanying explanation, the described embodiments are unique improvements over conventional air bag deployment systems. And while the embodiments shown here are preferred, they shall not be considered to be a restriction on the scope of the claims set forth below.

What is claimed is:

1. A panel for an automotive vehicle that contains a defined air bag deployment door, comprising:
    a relatively rigid base substrate structure having an outer surface and an inner surface;
    layers of sheet material being attached to and overlying said outer surface;
    said base structure being formed to define said inner and outer surfaces and a deployment door section;
    said deployment door section being defined in said base structure by a pre-weakened path; and
    an air bag chute containing an inner portion for containing an air bag and a flange portion surrounding said inner portion, wherein said flange includes at least one attachment rib projecting toward said base structure and bonded to said base structure to surround said deployment door section;
    wherein a non-bonded area exists between said inner portion and said bonded portion to form an air gap volume between said flange and said base structure that is bounded by said attachment rib, wherein the air gap is sufficiently large to permit entry of the air bag during deployment; and
    said flange includes a non-bonded deflector rib element integrally formed on the flange between said attachment rib and said inner portion that enters the air gap to block said air bag from contacting said attachment rib during deployment of said air bag.

2. A panel as in claim 1, wherein said air bag chute flange contains a plurality of integrally formed attachment ribs that are forced into contact with said base substrate structure to form said bonded area.

3. A panel as in claim 2, wherein said integrally formed attachment ribs are ultrasonically welded to said base substrate structure.

4. A panel as in claim 1, wherein and said air bag chute, base substrate, and said foam and skin layers are formed of a TPO material.

5. A panel as in claim 1, wherein said deflector rib element extends into said air gap volume with elements of varying heights.

6. A panel as in claim 5, wherein said deflector rib element is located between said inner portion and said pre-weakend path.

7. A panel as in claim 5, wherein said deflector rib element is located between said pre-weakend path and said attachment rib.

8. An air bag deployment system comprising:
    a relatively rigid base substrate structure having an outer surface and an inner surface;
    said base structure being formed to define an air bag deployment door section;
    said deployment door section being defined in said base substrate structure by a pre-weakened path; and
    an air bag chute containing a deployable air bag;
    said air bag chute having an open end adjacent said deployment door section and a flange portion surrounding said open end, wherein said flange includes at least one attachment rib projecting toward said base substrate structure and bonded to said inner surface of said base substrate structure surrounding said pre-weakened path of said deployment door section;
    wherein a non-bonded area exists between said open end and said bonded portion to form an air gap volume between said flange and said inner surface that is bounded by said attachment rib, wherein the air gap volume is sufficiently large to permit entry of the air bag during deployment; and
    said flange portion includes a non-bonded deflector element integrally formed on the flange portion between said attachment rib and said open end that enters the air gap to block said air bag from contacting said attachment rib during deployment of said air bag.

9. An air bag deployment system as in claim 8, wherein said air bag chute flange contains a plurality of integrally formed attachment ribs that are friction forced into contact with said base substrate structure to form said bonded area.

10. An air bag deployment system as in claim 9, wherein said integrally formed attachment ribs are ultrasonically welded to said base substrate structure.

11. An air bag deployment system as in claim 8, wherein said deflector element is an integrally formed rib on said flange extending parallel to said attachment rib.

12. An air bag deployment system as in claim 11, wherein said deflector element extends into said air gap volume at varying heights.

13. An air bag deployment system as in claim 12, wherein said deflector element is located between said open end and said pre-weakend path.

14. An air bag deployment system as in claim 12, wherein said deflector element is located between said pre-weakend path and said attachment rib.

* * * * *